(12) United States Patent
Newell

(10) Patent No.: US 8,133,291 B2
(45) Date of Patent: Mar. 13, 2012

(54) AIR FILTRATION FOR AIRCRAFT GROUND SUPPORT EQUIPMENT

(75) Inventor: Ty Allan Newell, Urbana, IL (US)

(73) Assignee: Hobart Brothers Company, Troy, OH (US)

( * ) Notice: Subject to any disclaimer, the term of this patent is extended or adjusted under 35 U.S.C. 154(b) by 343 days.

(21) Appl. No.: 12/496,450

(22) Filed: Jul. 1, 2009

(65) Prior Publication Data

US 2010/0000186 A1 Jan. 7, 2010

Related U.S. Application Data

(60) Provisional application No. 61/078,172, filed on Jul. 3, 2008.

(51) Int. Cl.
*B01D 50/00* (2006.01)

(52) U.S. Cl. ............ 55/385.1; 55/418; 55/503; 55/505; 55/467

(58) Field of Classification Search .............. 55/467, 55/385.1, 418, 503, 505
See application file for complete search history.

(56) References Cited

U.S. PATENT DOCUMENTS

| | | |
|---|---|---|
| 4,142,809 A | 3/1979 | Shell |
| 5,106,397 A | 4/1992 | Jaroszczyk et al. |
| 6,764,593 B1 | 7/2004 | Pace |
| 7,326,388 B2 * | 2/2008 | Uslenghi et al. ........... 422/186.3 |
| 7,927,393 B2 * | 4/2011 | Sanami ......................... 55/385.3 |
| 2004/0262918 A1 | 12/2004 | Janis et al. |
| 2005/0285066 A1 | 12/2005 | Huang |
| 2006/0123804 A1 | 6/2006 | Widegren |
| 2009/0107159 A1 | 4/2009 | Mann et al. |
| 2009/0107160 A1 | 4/2009 | Montminy et al. |
| 2009/0107657 A1 | 4/2009 | Montminy et al. |
| 2009/0108549 A1 | 4/2009 | Montminy et al. |
| 2009/0108552 A1 | 4/2009 | Mann, III et al. |
| 2009/0110471 A1 | 4/2009 | Montminy et al. |
| 2009/0112368 A1 | 4/2009 | Mann, III et al. |
| 2009/0121552 A1 | 5/2009 | Mann, III et al. |

OTHER PUBLICATIONS

International Search Report for application No. PCT/US2009/049503 mailed Aug. 31, 2009.
Written Opinion for application No. PCT/US2009/049503 mailed Aug. 31, 2009.

* cited by examiner

*Primary Examiner* — Robert A Hopkins
(74) *Attorney, Agent, or Firm* — Fletcher Yoder, P.C.

(57) ABSTRACT

Air filtration devices and systems are provided to filter conditioned air after air exits an air conditioner module located on a ground support equipment unit but prior to entering a grounded aircraft. Disclosed embodiments include a system with the air filtration unit located along a hose originating from an aircraft ground support unit and a system with the air filtration unit located along a hose originating from an aircraft. Certain embodiments of the air filtration unit include a diffuser, which is configured to couple to a filter and direct air through the filter during operation.

19 Claims, 4 Drawing Sheets

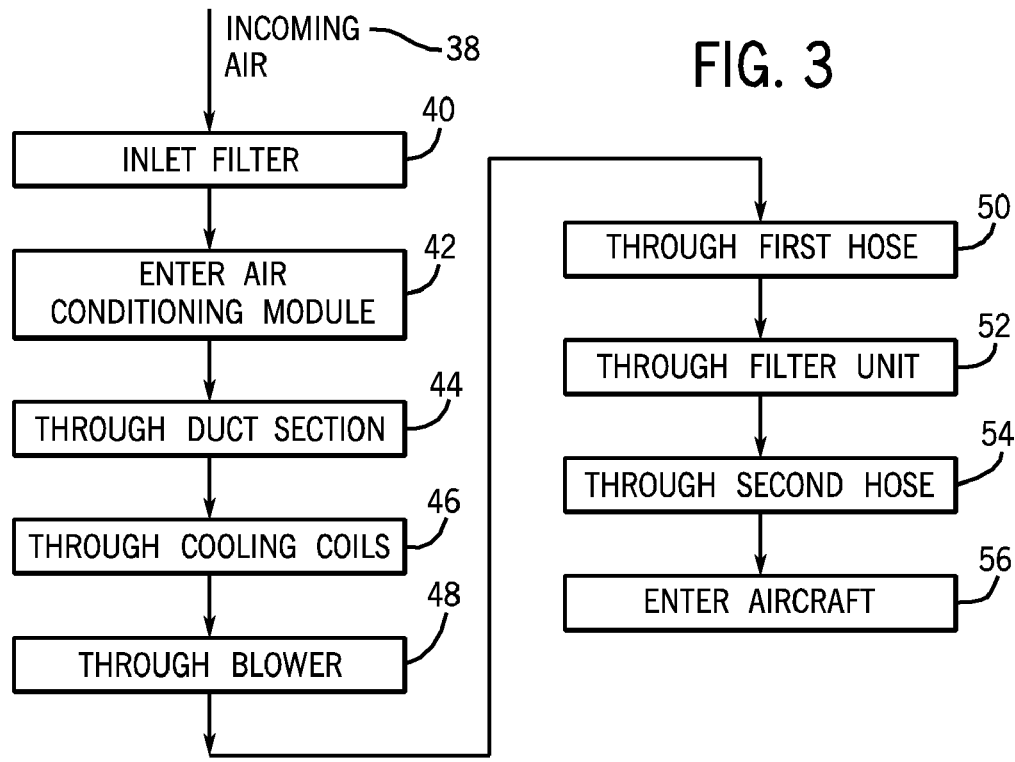
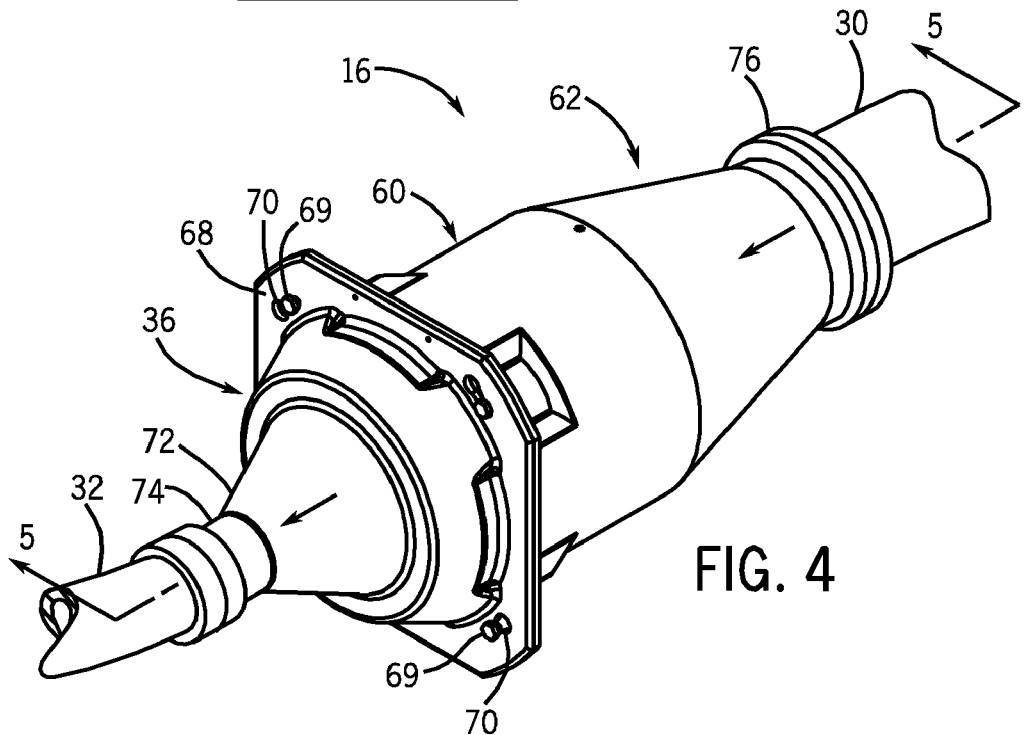

AIR FILTRATION FOR AIRCRAFT GROUND SUPPORT EQUIPMENT

CROSS-REFERENCE TO RELATED APPLICATIONS

This application claims the benefit of U.S. Provisional Patent Application No. 61/078,172, entitled "After-Conditioning Air Filtration for Ground Support Equipment", filed Jul. 3, 2008, which is herein incorporated by reference.

BACKGROUND

The present disclosure relates generally to ground support equipment for aircraft and, more particularly, to air filtration devices that may be used with such equipment.

Prior to a flight, aircraft often spend a considerable amount of time on the ground to load passengers, repair or replace parts, load equipment, and so forth. Electrical power is often required to support such activities. However, grounded aircraft often have their engines shut down and, therefore, are unable to provide power for electrical systems, air conditioning systems, and the like. Accordingly, when grounded, traditional aircraft systems are temporarily connected to a variety of ground support equipment that may be mounted on portable carts that are placed in close proximity to the grounded aircraft. Such ground support equipment typically includes an air conditioner unit capable of providing conditioned air to the aircraft electronics, passenger cabins, equipment, and so forth. However, in some cases, such conditioned air may include particulates or other contaminants that negatively impact the operation of an aircraft. Accordingly, there exists a need for systems that address this problem.

BRIEF DESCRIPTION

Certain aspects of embodiments disclosed herein by way of example are summarized below. It should be understood that these aspects are presented merely to provide the reader with a brief summary of certain forms an invention disclosed and/or claimed herein might take, and that these aspects are not intended to limit the scope of any invention disclosed and/or claimed herein. Indeed, any invention disclosed and/or claimed herein may encompass a variety of aspects that may not be set forth below.

Embodiments of an air filtration unit are provided to filter conditioned air after exiting an air conditioner module located on a ground support equipment unit but prior to entering a grounded aircraft. The disclosed embodiments include a system with the air filtration unit located proximate to the ground support equipment unit and a system with the air filtration unit located proximate to the grounded aircraft. Certain embodiments of the air filtration unit include a diffuser, which is configured to couple to a filter and direct air through the filter during operation. In some embodiments, the diffuser is sufficiently conical to direct airflow around the periphery of the filter. Some embodiments of the air filtration unit may be suitable for use with a variety of ground support equipment units customized for particular aircraft.

Various refinements of the features noted above may exist in relation to various aspects of the present invention. Further features may also be incorporated in these various aspects as well. These refinements and additional features may exist individually or in any combination. For instance, various features discussed below in relation to one or more of the illustrated embodiments may be incorporated into any of the above-described aspects of the present invention alone or in any combination. Again, the brief summary presented above is intended only to familiarize the reader with certain aspects and contexts of embodiments of the present invention without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein:

FIG. 3 is a block diagram illustrating an airflow path through internal components of an air conditioning unit into an aircraft in accordance with aspects of the present disclosure;

FIG. 4 is a perspective view of an exemplary air filtration unit in accordance with aspects of the present disclosure.

DETAILED DESCRIPTION

Figure 1:
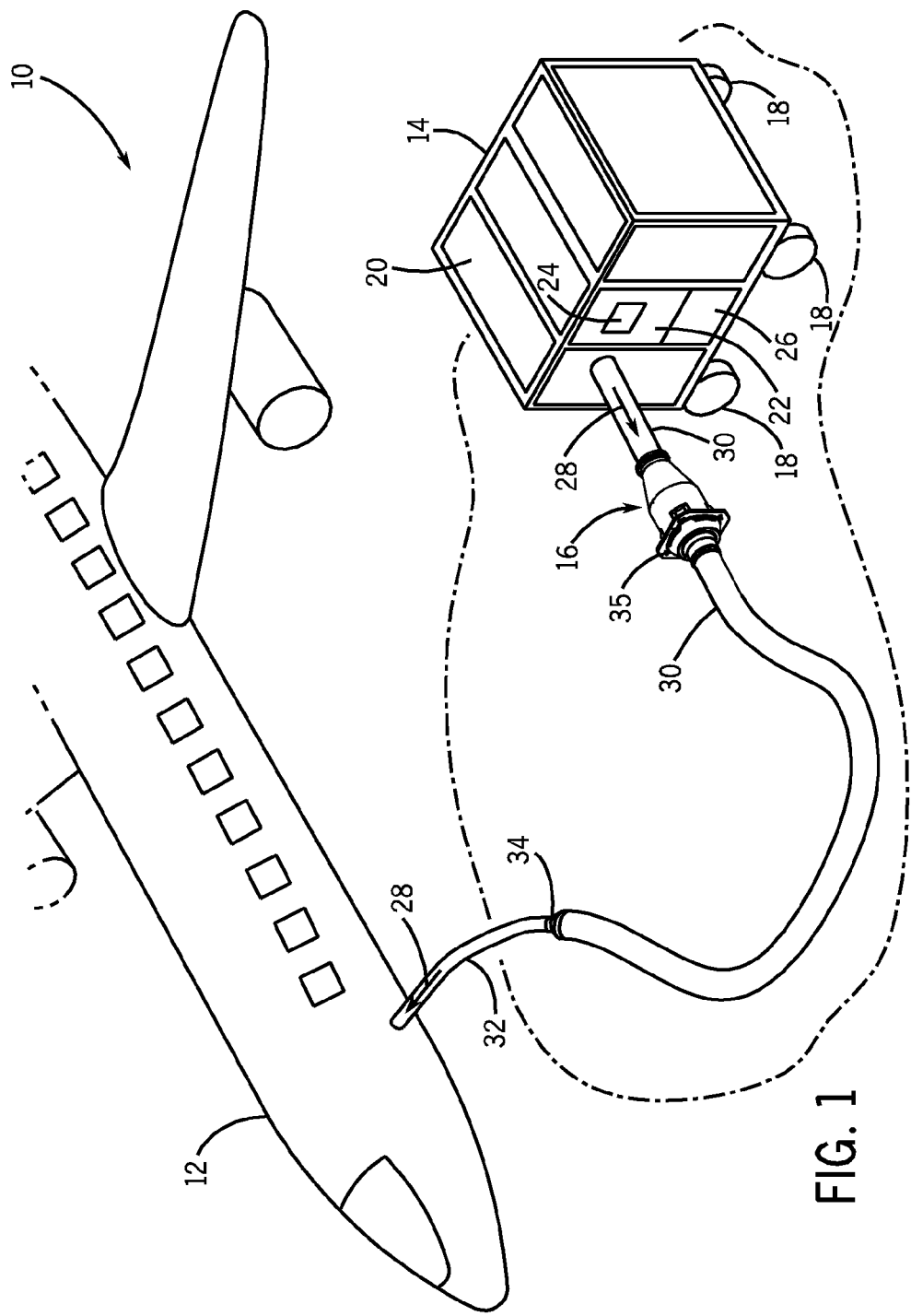
FIG. 1 illustrates a perspective view of an exemplary air filtration unit located along a hose originating from an aircraft ground support unit in accordance with aspects of the present disclosure.

One or more specific embodiments will be described below. These described embodiments are provided only by way of example, and do not limit the scope of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments described below, the articles "a," "an," and "the" are intended to mean that there are one or more of the elements. The terms "comprising," "including," and "having" are intended to be inclusive and mean that there may be additional elements other than the listed elements. Moreover, while the term "exemplary" may be used herein in connection to certain examples of aspects or embodiments of the presently disclosed subject matter, it will be appreciated that these examples are illustrative in nature and that the term "exemplary" is not used herein to denote any preference or requirement with respect to a disclosed aspect or embodiment. Additionally, it should be understood that references to "one embodiment," "an embodiment," "some embodiments," and the like are not intended to be interpreted as excluding the existence of additional embodiments that also incorporate the disclosed features.

As discussed in further detail below, various embodiments of an air filtration unit are provided to filter conditioned air after exiting an air conditioner unit located on a ground support equipment unit but prior to entering an aircraft. In one embodiment, the air filtration unit is capable of connecting to a 4" or 8" diameter hose, suitable for use with a variety of carts customized for particular aircraft, capable of being manufactured as a stand-alone unit, capable of maintaining the airflow velocity and pressure established after exiting the air conditioning unit, able to be easily replaced or repaired, and so forth. The disclosed embodiments include a system with the air filtration unit located proximate to an aircraft ground support unit and a system with the air filtration unit located proximate to an aircraft. Certain embodiments of the air filtration unit include a diffuser, which is configured to couple to a filter and direct air through the filter during operation. In some embodiments, the diffuser is sufficiently conical to direct airflow accordingly. The foregoing features, among others, of the air filtration unit may have the effect of minimizing damage to internal components of an aircraft that may be sensitive to particulates present in contaminated airflow streams.

Figure 2:
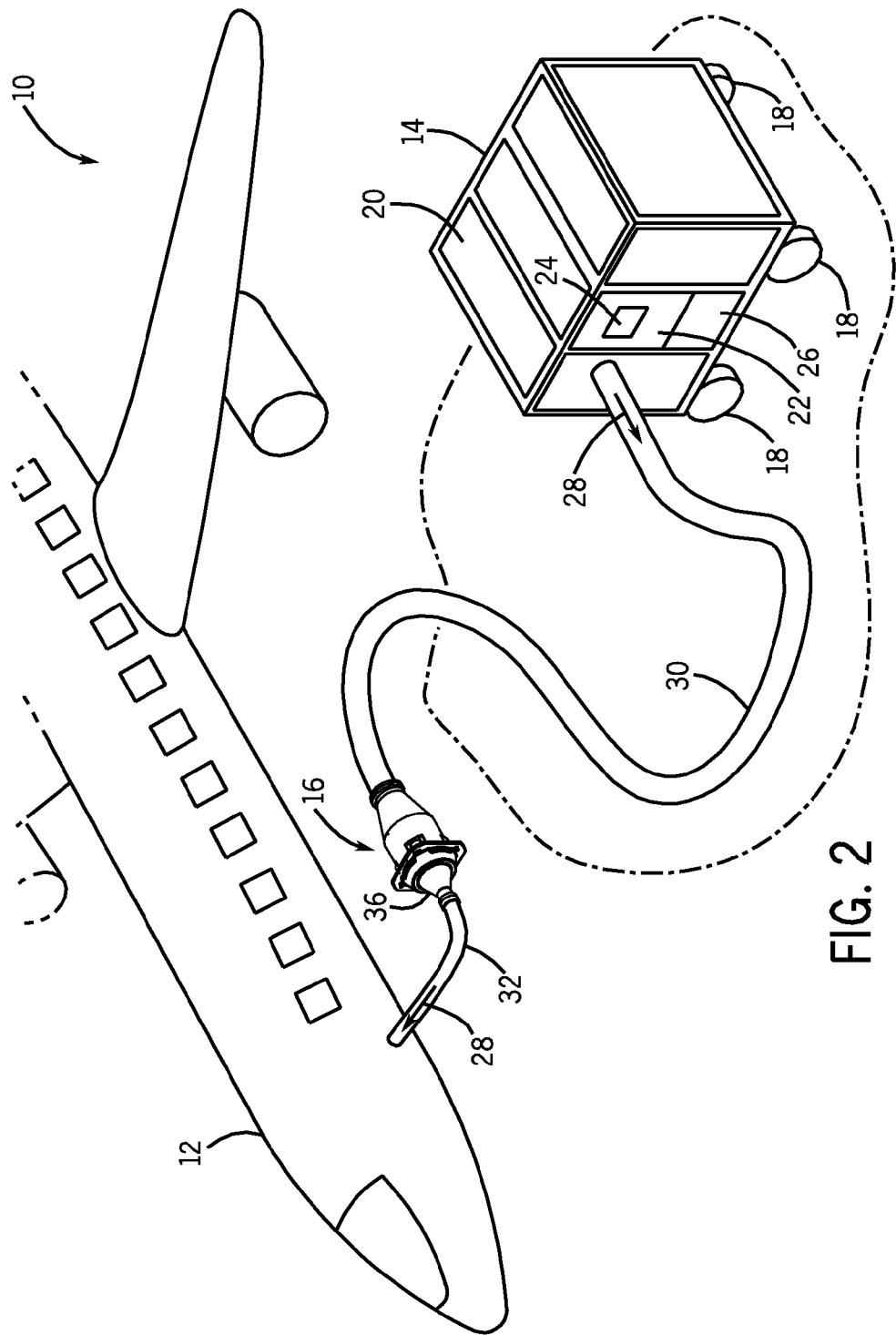
FIG. 2 illustrates a perspective view of an exemplary air filtration unit located between a first hose originating from an aircraft ground support unit and a second hose originating from an aircraft in accordance with aspects of the present disclosure.

Turning now to the drawings, FIGS. 1 and 2 illustrate a grounded aircraft system 10 that includes a grounded aircraft 12, a ground support equipment unit 14, and an air filtration unit 16 in accordance with aspects of the present disclosure. In certain embodiments, the grounded aircraft 12 may be a military aircraft, such as a military jet, helicopter, or carrier plane, which may include electronic or other equipment that may be sensitive to particulates. However, it should be noted that in other embodiments, the grounded aircraft 12 may be any aircraft with its engines shut down, such as a commercial jet used to carry civilian passengers. Furthermore, it should be noted that the air filtration unit 16 may be used in any air delivery system designed to deliver cooled, filtered, and/or otherwise conditioned (e.g., heated) air to the grounded aircraft 12.

In some embodiments, the ground support equipment unit 14 may be a cart with wheels 18 that is towable to a location proximate to the aircraft 12. Furthermore, the ground support equipment unit 14 may provide air conditioning, avionics equipment liquid cooling, power, or a combination thereof to the aircraft 12 during engine shutdown periods. The unit 14 may be any one of a variety of custom or standard ground support equipment devices suitable for use with any grounded aircraft 12. The illustrated ground support equipment unit 14 includes an air conditioning module 20 configured to receive air of ambient temperature and output conditioned air. The ground support equipment unit 14 includes a control panel 22 with a screen 24 through which a user may control and program outputs of the unit 14. A panel 26 below the control panel 22 may provide electrical connections with ports configured to receive standard or custom plugs.

Airflow, as represented by arrows 28, exiting the air conditioning module 20 enters one or more hoses 30. In one embodiment, one hose 30 is configured to attach the air conditioning module 20 to the air filtration unit 16 and another hose 30 is configured to attach to the air filtration unit 16 to a hose 32. In one embodiment, a diameter of the hose 30 is approximately eight inches. It should be noted, however, that in other embodiments, the diameter of the hose 30 may be more or less than eight inches. Before reaching the aircraft 12, the airflow, as represented by arrow 28, flows through the air filtration unit 16 and the hose 32 that is configured to attach to the aircraft 12. In one embodiment, a diameter of the hose 32 is approximately four inches. However, it should be noted that in other embodiments, the diameter of the hose 32 may be more or less than four inches.

In the embodiment illustrated in FIG. 1, the air filtration unit 16 is located along a hose 30 such that air is filtered as it exits the air conditioning module 20 and before it enters the hose 32. It should be noted that in one embodiment, the air filtration unit 16 may be located along a hose 30 in close proximity to the air conditioning module 20 such that the air filtration unit 16 does not lie on the ground. However, in other embodiments, the air filtration unit 16 may be located anywhere along the length of a hose 30. In this embodiment, a connector 34 may be used to connect a hose 30 of a larger diameter with the hose 32 of a smaller diameter. Additionally, the air filtration unit 16 includes a connector 35 that is configured to receive a hose 30.

The air filtration unit 16 may offer distinct advantages over traditional air conditioner units that exclusively filter air at the entrance of the air conditioner module 20 prior to its path through internal components. In certain instances, internal components of the air conditioner module 20, such as blowers or coils, may malfunction, break, or wear out during operation. In such instances, air filtered at the entrance of the air conditioner module 20 may become polluted with undesirable contaminants within the air conditioner module 20. Accordingly, in these instances, contaminated airflow may enter the aircraft 12. Temporary contaminated airflow in certain types of aircraft 12, such as some commercial planes, may only introduce a minor inconvenience. However, contaminated airflow in aircraft 12 with sensitive equipment, such as military jets, may pose serious problems. For instance, contaminated airflow may damage expensive and/or difficult-to-fix electronic equipment. Disclosed embodiments of the air filtration unit 16 offer improved air filtration that may have the effect of substantially preventing contaminated air from reaching aircraft 12.

In the embodiment illustrated in FIG. 2, the air filtration unit 16 is located at the interface between the hose 30 and the hose 32. In this embodiment, the air filtration unit may filter particulates that contaminate the airflow 28 during travel through the hose 30, as well as particulates accumulated in the air from internal components of the air conditioning module 20. Additionally, in the embodiment illustrated in FIG. 2, the air filtration unit 16 may function as a connector between the hose 30 of a larger diameter and the hose 32 of a smaller diameter, thus eliminating the need for the connector 34 of FIG. 1. Accordingly, the air filtration unit 16 may include a connector 36 that is configured to receive the hose 32. It should be noted that in a preferred embodiment, the air filtration unit 16 is located along the hose 32 in close proximity to the aircraft 12 such that the air filtration unit 16 does not lie on the ground. However, it should also be noted that in other embodiments, the air filtration unit 16 may be located anywhere along the length of the hose 32.

FIG. 3 is a block diagram illustrating an exemplary airflow path that may be established through internal components of the air conditioning module 20 and into the aircraft 12 during operation of the embodiment illustrated in FIG. 2. Although the presently illustrated embodiment generally depicts airflow through components configured to cool the air, it is noted that the present techniques may also be employed with other air conditioning systems, such as those that heat the air within the air conditioning module 20. With respect to the presently illustrated embodiment, incoming air 38 first enters a filter at the inlet of the air conditioning module 20, as represented by block 40. Air exiting the filter enters the air conditioning module 20, as represented by block 42, and transits through a duct section, as represented by block 44. Next, air flows through cooling coils that cool the air from ambient temperature to a predetermined setpoint, as represented by block 46.

Cooled air then enters a blower, as represented by block 48, which forces the airflow 28 out the air conditioning module 20 and through a first hose (e.g., a hose 30), as represented by block 50. Air exiting the first hose proceeds through the air filtration unit 16, as represented by block 52, and through the second hose (e.g., combination of additional hose 30 and hose 32 (FIG. 1), or hose 32 alone (FIG. 2)), as represented by block 54, before entering the aircraft 12, as represented by block 56. Present embodiments provide filtering in the air filtration unit 16 after air flows through internal components of the air conditioning module 20. Such embodiments may offer distinct advantages over traditional systems, which exclusively filter air at the entrance of the air conditioning module 20. For instance, contaminants due to a malfunction or breakdown of an internal component (e.g., the blower) that may enter an aircraft 12 in traditional systems will be filtered in present embodiments before entering the aircraft 12.

Figure 5:
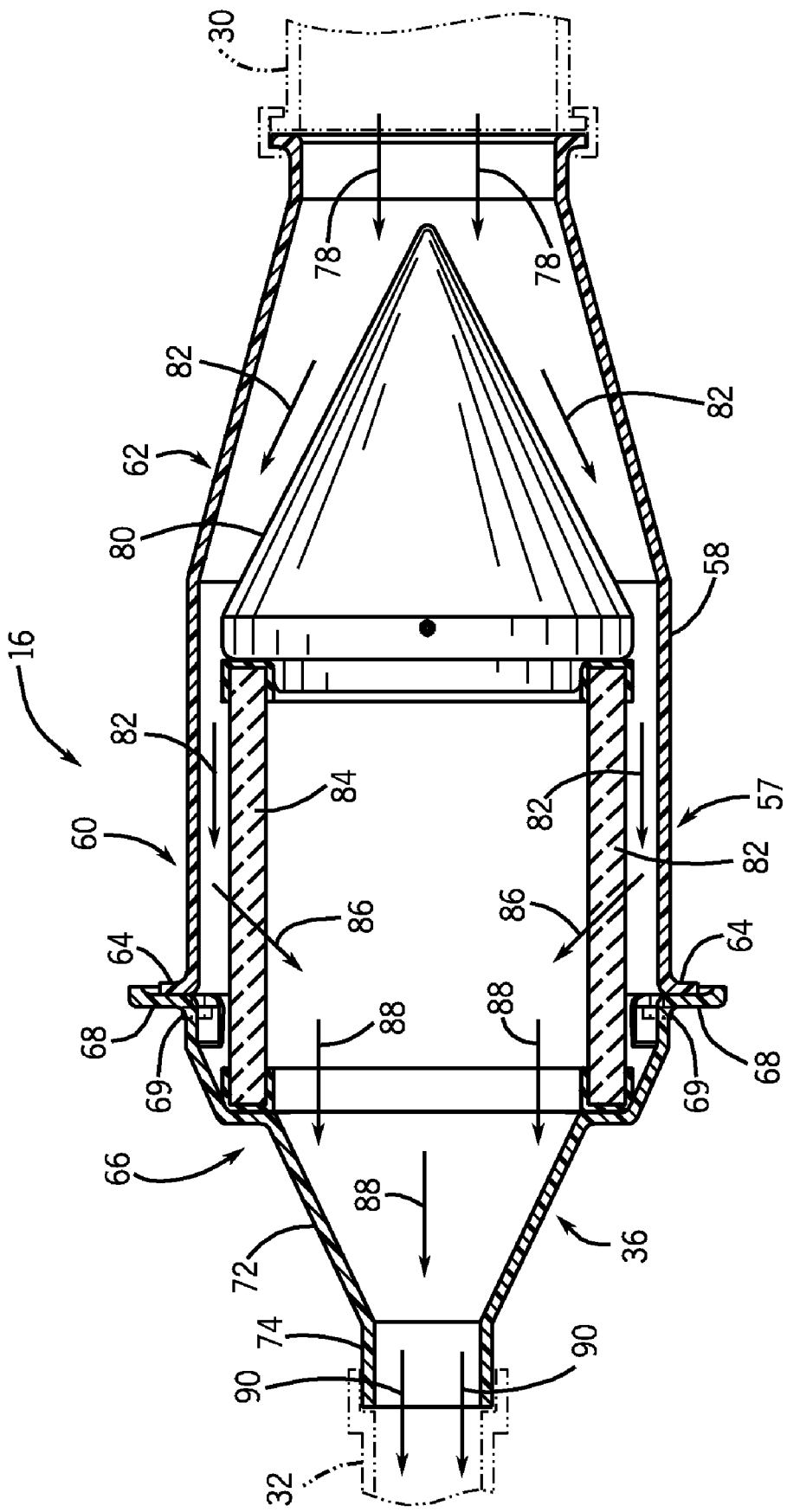
FIG. 5 is a sectional view of the exemplary air filtration unit of FIG. 4 in accordance with aspects of the present disclosure.

FIGS. 4 and 5 illustrate the air filtration unit 16 in greater detail in a perspective view and a sectional view, respectively, in accordance with one embodiment. The air filtration unit 16 includes a housing 57 that includes a body 58 with a first portion 60 having a single diameter throughout and a second portion 62 having a diameter that tapers off lengthwise. The body 58 includes an outer rim 64 that is configured to removably attach to the connector 36. The connector 36 includes a body 66 having a rim 68 that is configured to removably attach to the outer rim 64 of the body 58 via one or more securement mechanisms (e.g., bolts 69) that may fit into apertures 70. For instance, in one embodiment, the apertures 70 may be keyhole apertures that facilitate the connection between the connector 36 and the body 58. That is, the apertures 70 may receive bolts 69 that slide across the apertures 70 and allow the connector 36 to be secured to the body 58 by rotating the connector 36 (e.g., in a counter-clockwise direction in FIG. 4) with respect to the body 58. It should be noted that in other embodiments alternate securement mechanisms may be used to secure the connector 36 to the body 58.

The connector 36 also includes a conical extension 72 that tapers off into a cylindrical extension 74 that is configured to mate with the hose 32. In one embodiment, the cylindrical extension 74 may have a diameter approximately equal to four inches that is configured to mate with the hose 32. An additional connector 76 removably attaches the body 58 to the hose 30. It should be noted that in other embodiments, such as the one illustrated in FIG. 1, the connector 35 may removably attach to the body 58 instead of the connector 36. In such embodiments, the connector 35 is configured to mate with a hose 30. That is, in embodiments in which hose 30 has a diameter substantially different than hose 32, the connector 35 and the connector 36 may be interchangeable such that the air filtration unit 16 may be attached to either hose 30 or 32, thus providing a modular air filtration unit 16.

The cross-sectional view illustrated in FIG. 5 illustrates an exemplary airflow path through the air filtration unit 16. During operation, unfiltered air first enters the body 58 of the air filtration unit 16, as represented by arrows 78. A diffuser 80 cooperates with the tapered portion 62 of the body 58 to direct the incoming air along the path illustrated by arrows 82 around a conical portion of the diffuser 80 to the periphery of a filter 84. In the illustrated embodiment, the filter 84 is illustrated as a single unit. However, it should be noted that in other embodiments, the filter 84 may be provided in the form of multiple filter units. The filter 84 may be a cartridge-style filter, and may be a disposable filter designed for a single use or may be washable and designed for multiple uses. Air from the peripheries of the one or more filters 84 travels through the filters 84 where particulates may be removed, as illustrated by arrows 86. Finally, the air flows through the conical extension 72, as illustrated by arrows 88, and out the cylindrical extension 74 into the hose 32, as illustrated by arrows 90. It should be noted that one or more securement mechanisms, such as screws, bolts, and so forth, may be used to couple the diffuser 80, the filter 84, and the body 58 of the air filtration unit 16 together. In one embodiment, such as that illustrated in FIG. 5, the diffuser 80 may include a projecting portion configured to engage and be received by the filter 84 in a press fit arrangement. Additionally, it is further noted that the various components of the air filtration unit 16 may be formed from any suitable materials, such as aluminum, polymer, plastic, and the like.

In one embodiment, the filter 84 may be designed such that a velocity of the incoming airflow 78 is maintained as the air travels along a periphery of the filter 84. Accordingly, in such an embodiment, the foregoing feature may have the effect of preventing an undesirable pressure drop as the air flows through the air filtration unit 16. A pressure drop may be undesirable since a drop in pressure may restrict airflow, increase the horsepower necessary for the blower, and increase the load placed on the air conditioning module 20. In one embodiment, the filter 84 may be configured for use with an eight inch first hose 30 and may be cylindrical with a diameter approximately equal to eight inches. Additionally, it should be noted that in some embodiments the filter 84 may include a thin layer of insulation to avoid heat gain and sweating in some embodiments.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system comprising:
an air filtration device for use with a grounded aircraft system, the air filtration device comprising:
a housing configured to receive conditioned air and to output the conditioned air to an aircraft, the housing comprising a first end configured to removably attach to a first hose to receive the conditioned air and a second end configured to removably attach to a second hose to output the conditioned air;
a filter removably secured inside the housing and configured to filter the conditioned air flowing through the housing between the first end and the second end; and
a diffuser removably secured inside the housing and configured to direct airflow toward a periphery of the filter.

2. The system of claim 1, wherein the first hose fluidly couples the air filtration device to a ground support equipment cart for a grounded aircraft.

3. The system of claim 2, wherein the first hose fluidly couples the air filtration device to an air conditioning module of the ground support equipment cart.

4. The system of claim 2, wherein the aircraft is a military aircraft.

5. The system of claim 1, wherein the second hose fluidly couples the air filtration device to the aircraft.

6. The system of claim 1, wherein a diameter of the first hose and a diameter of the second hose are approximately equal.

7. The system of claim 1, wherein a diameter of the first hose is substantially different than a diameter of the second hose.

8. The system of claim 7, wherein the diameter of the first hose is approximately eight inches and the diameter of the second hose is approximately four inches.

9. The system of claim 1, comprising the first hose and the second hose.

10. The system of claim 1, wherein the housing includes a removable connector, wherein the connector is configured to attach to the first hose or the second hose.

11. A system comprising:
   a ground support equipment unit comprising an air conditioning module configured to output conditioned air to an aircraft; and
   an air filtration device configured to receive and to filter the conditioned air, the air filtration device comprising:
   a body comprising a first end configured to receive the conditioned air from the air conditioning module and a second end configured to output the conditioned air to the aircraft; and
   a filter removably secured inside the body and configured to filter air flowing through the air filtration device between the first end and the second end.

12. The system of claim 11, comprising a diffuser removably secured inside the body and configured to direct airflow toward a periphery of the filter.

13. The system of claim 11, wherein the first end of the body is configured to removably attach to a first hose that fluidly couples the air conditioning module to the air filtration device.

14. The system of claim 11, comprising a plurality of interchangeable connectors, wherein the second end of the body is configured to engage any one connector of the plurality of interchangeable connectors to facilitate removably attaching the body to a second hose that fluidly couples the air filtration device to the aircraft.

15. An air filtration device for use with a grounded aircraft system comprising:
   a body comprising a tapered first end configured to removably attach to a first hose to facilitate fluid communication between the air filtration device and a ground support equipment unit, and a second end configured to engage a connector that is configured to removably attach to a second hose to facilitate fluid communication between the air filtration device and an aircraft;
   a filter removably secured inside the body and configured to filter air flowing through the air filtration device; and
   a diffuser removably secured inside the body, the diffuser including a tapered edge configured to cooperate with the tapered first end of the body to direct airflow toward an exterior surface of the filter.

16. The air filtration device of claim 15, wherein the filter comprises only a single filter unit.

17. The air filtration device of claim 15, wherein the air filtration device is configured to maintain a velocity of incoming air as the incoming air travels along the exterior surface of the filter.

18. The air filtration device of claim 15, wherein the connector comprises apertures configured to receive securement devices and facilitate attachment of the first connector to the body.

19. The air filtration device of claim 18, wherein the apertures comprise keyhole apertures configured to cooperate with the securement devices to secure the connector to the body via rotation of the connector with respect to the body.

* * * * *